United States Patent
Hamar et al.

(10) Patent No.: US 6,825,923 B2
(45) Date of Patent: Nov. 30, 2004

(54) LASER ALIGNMENT SYSTEM WITH PLURAL LASERS FOR IMPINGEMENT ON A SINGLE TARGET

(75) Inventors: Martin R. Hamar, Wilton, CT (US); Carlos Araujo, Danbury, CT (US)

(73) Assignee: Hamar Laser Instruments, Inc., Danbury, CT (US)

( * ) Notice: Subject to any disclaimer, the term of this patent is extended or adjusted under 35 U.S.C. 154(b) by 149 days.

(21) Appl. No.: 10/422,047

(22) Filed: Apr. 23, 2003

(65) Prior Publication Data

US 2003/0193664 A1 Oct. 16, 2003

Related U.S. Application Data (63) Continuation-in-part of application No. 09/681,132, filed on Jan. 18, 2001.
(60) Provisional application No. 60/188,415, filed on Mar. 10, 2000.

(51) Int. Cl.[7] .................................................. G01C 1/00
(52) U.S. Cl. .................................. 356/152.1; 356/152.2
(58) Field of Search .......................... 356/152.1, 152.2, 356/153, 375, 450–521

(56) References Cited

U.S. PATENT DOCUMENTS 3,902,036 A      8/1975  Zaleckas
4,105,339 A   *  8/1978  Wirtanen
4,367,949 A      1/1983  Lavering
4,738,531 A      4/1988  Lloyd et al.
4,902,128 A      2/1990  Siebecker et al.
5,035,503 A   *  7/1991  Sadeh et al.

* cited by examiner

Primary Examiner—Bernarr E. Gregory
Assistant Examiner—Brian K Andrea
(74) Attorney, Agent, or Firm—Anthony J. Casella; Gerald E. Hespos (57) ABSTRACT

A laser alignment system is provided. The system includes a plurality of lasers which are sequentially operative for producing first and second laser beams that are parallel to one another. The system further includes a target assembly. The target assembly includes lenses and mirrors disposed such that the first laser beam impinges directly on the target to provide displacement data. The second laser beam is focused and reflected so that the focal point of the reflected second beam impinges on the target. In a similar manner, a third parallel beam may be provided and may be focused to impinge on the target. Additionally, the plural laser beams may be substituted for by a single laser plane. The second and/or third beams provide alignment data, while the first beam provides displacement data.

23 Claims, 7 Drawing Sheets

LASER ALIGNMENT SYSTEM WITH PLURAL LASERS FOR IMPINGEMENT ON A SINGLE TARGET

This application is a continuation-in-part of U.S. patent application Ser. No. 09/681,132 filed Jan. 18, 2001.

This application also claims the benefit of the filing date of Provisional Patent Application, U.S. Ser. No. 60/188,415 filed Mar. 10, 2000, the disclosure of which is incorporated herein by reference.

BACKGROUND OF THE INVENTION

1. Field of the Invention

The subject invention relates to a laser alignment system which comprises a plurality of lasers, a target and a computer for controlling operation of the lasers and for analyzing signals produced by the target for determining spatial location and angular/slope data.

2. Description of the Related Art

Many manufacturing processes require the alignment of a plurality of parts that are spaced from one another. For example, a rotating tool may require a specified alignment to a workpiece for boring a hole in the workpiece or for taping threads into a previously bored hole. In other situations, arrays of rotors or stators must be precisely aligned to the axis of a turbine. In still other situations, sheaves or pulleys of a machine tool should be mounted to rotational axes that are precisely parallel to one another, at specified distances and with the sheaves in a common plane. Other manufacturing processes require parts to be assembled at specified positions relative to reference planes. For example, seats and storage bins on large aircraft should be accurately positioned relative to horizontal and vertically aligned planes extending along the length of the aircraft.

Historically, most of the above-described alignment has been carried out with purely mechanical devices, such as bubble levels, or by purely optical devices, such as sight gages. However, a very effective prior art apparatus for checking alignment includes a laser emitter and a photosensitive target. The laser emitter produces a perfectly straight beam that is not affected by gravity. The target is operative to generate signals that identify the center of energy of the laser beam impinging on the target. The target of the prior art laser alignment system typically is connected to a computer which calculates certain displacement and angular alignment information based on the signals produced by the target. This prior art system is used by mounting the laser to a fixed location and by mounting the target to a specified location on a part that must be aligned. A very simple but effective apparatus for aligning a rotating tool to a master part or workpiece is disclosed in U.S. Pat. No. 4,566,202 which is assigned to the assignee of the subject invention.

Some prior art laser apparatus include a penta-prism which is operative to receive an input laser beam and to reflect that input laser beam through precisely 90°. The penta-prism then may be rotated about the axis defined by the input laser beam. Thus, the output laser beam effectively sweeps a flat laser plane that is perpendicular to the input laser beam. The plane produced by the rotating laser defines a frame of reference. A plurality of targets then may be positioned in the reference plane, and the locations of those targets can be measured precisely relative to the reference plane. A laser apparatus with a rotating penta-prism for sweeping a flat optical plane is shown in U.S. Pat. No. 4,297,031 which is assigned to the assignee of the subject invention. U.S. Pat. No. 4,297,031 also shows the above-referenced plurality of photosensitive targets mounted at locations to be impinged upon by the rotating output laser.

The assignee of the subject invention also is the owner of U.S. Pat. No. 5,307,368 which is directed to an apparatus for simultaneously generating a plurality of mutually perpendicular planes. The device shown in U.S. Pat. No. 5,307,368 enables targets to be placed in each of the mutually perpendicular planes for positioning an object relative to those planes.

The above-described prior art laser alignment systems typically employ a plurality of targets for defining position and alignment relative to at least one plane swept by at least one rotating output laser beam. For example, a plurality of photosensitive target cells have been used in the prior art to assess both displacement and angular misalignment.

In recent years, low cost, low accuracy laser alignment systems have entered the market. The availability of a lower cost, albeit poorer quality, laser alignment system has created a market pressure to decrease the cost for the high quality laser alignment systems. During this same time span, the cost of photosensitive target cells has remained high, and in some instances has increased. Hence, the cost for photosensitive targets in a laser alignment system that requires plural targets limits the ability to respond to market pressures for lower cost alternatives without sacrificing accuracy or the quality of workmanship. Simultaneously, however, the cost of lasers has decreased significantly.

In view of the above, it is an object of the subject invention to provide a low cost, high quality laser alignment system.

Another object of the subject invention is to provide a laser alignment system that enables an assessment of displacement and angular alignment errors with a single target.

A further object of the subject invention is to provide a laser alignment system with plural laser beams and a single target for assessing displacement and angular alignment.

SUMMARY OF THE INVENTION

The subject invention is directed to a laser alignment system comprising a plurality of lasers and a light and position-sensitive target cell. A control system may be provided for turning the lasers on and off sequentially. Thus, the single light and position-sensitive target cell is operative to sequentially generate signals indicative of locations at which the respective laser beams impinge upon the target cell. The control system may further be connected to the target cell for receiving signals produced by the target cell and for analyzing the signals to provide position and alignment information.

The system of the subject invention may include first and second lasers and a beam splitter. The beam splitter may be positioned in proximity to the single light and position-sensitive target cell. In particular, the beam splitter may be disposed such that a first beam produced by the first laser passes through the beam splitter and impinges upon the target cell. As the target cell is moved relative to the first beam, vertical and horizontal position signals are generated. The second laser produces a second beam that is aligned generally parallel to the first beam. The system further includes a mirror disposed to align with the second beam. The mirror reflects the beam to the beam splitter which further reflects the beam onto the light and position-sensitive target cell. Additionally, the system may include a lens disposed between the source of the second beam and the mirror. Thus, the second beam is focused by the lens and is directed toward the mirror. The combined optical distance from the lens to the mirror, from the mirror to the beam splitter and from the beam splitter to the target cell is selected to substantially equal the focal length of the lens. Thus, the second beam will substantially focus on the single light and position-sensitive cell in the target assembly.

When the first laser is turned on, the first beam acts as a position measuring device that generates X-axis and Y-axis (horizontal and vertical) position signals to indicate displacement of the target assembly relative to the incoming first laser beam. When the second laser is turned on, the target acts as an angle or slope sensitive target in both pitch and yaw. Additional readings of the cell are taken a short time after each of the center or angle readings. These readings constitute background light readings and are subtracted from the respective readings when the laser is on. The result is a compensation for the background light that is also falling on the target cell.

An alternate embodiment of this invention includes a lens, a quarter wave plate, a mirror and first and second lasers. The first laser produces a first beam that passes straight through the lens. The lens starts to focus the beam on the cell. The second laser produces a second laser beam that is parallel to or off-axis relative to the first beam. The second beam passes through the lens, hits the mirror, reflects back to the polarizing beam splitter coating on the back of the lens and further reflects to focus on the cell. The second beam is the angle beam and the combination of the lens, the mirror and the polarizing beam splitter coating constitutes a system that ends up focusing the second beam on the surface of the target cell. This combination acts as a collimator. The cell cooperates with the second beam to measure the angle of the target axis relative to the second beam. The first beam, on the other hand, goes straight through the lens and is partially focused. The first beam and the cell act as a center measuring device and provides signals indicative of X-axis and Y-axis (horizontal and vertical) position or displacement. If the target is moved laterally or perpendicular to the first beam, then position information is read from the target cell substantially as in prior art targets. The problem with the system as described above is that the partial focusing means also is partially sensitive to angle. A conventional target with no lens measures center, but is not sensitive to angle. However, in the subject invention, due to the fact that angle is measured, the center reading can be corrected for any angle.

The primary advantage of this latter embodiment is that the combination of the first beam and the lens of the cell act such that spot size is reduced in diameter. This effectively increases the cell size, and hence the range of measurement is increased. The amount of the increase is proportional to the ratio of the focal length of the lens divided by the distance from the nodal point of the lens to the surface of the cell. As noted above, position sensitive target cells can be expensive, especially for larger sizes. Smaller cells, however, are relatively inexpensive. Thus, an advantage of the system described above is that a small cell can behave as if it were physically much larger by the ratio of the two distances, as long as resolution is adequate. Thus, the above-described combination uses a very economical method of achieving larger measurement ranges.

The second beam is focused onto the photosensitive target, as described above. In particular, the lens of the above-described system is a piano-concave lens with a polarizing sensitive 50%—50% beam splitter coating on the plane or flat side of the lens. A polarizing sensitive coating will transmit almost 100% of P polarization and almost totally reflect S polarization. The plane of polarization of both the first and second beams are rotated so that approximately 100% of their light is transmitted. In this embodiment, a quarter wave plate is aluminum, Al, coated on the back to form a mangrin mirror. A quarter wave plate will take a plane polarized beam and turn it into a circularly polarized beam. Upon reflection, the beam will change "hand" from right circularly polarized to left hand. As the second beam passes again through the quarter wave plate, it is changed from circularly polarized light back to linear, but is rotated 90°. The second beam then reflects 100% off the back of the lens and focuses on the lens.

DETAILED DESCRIPTION OF THE PREFERRED EMBODIMENTS

Figure 1A:
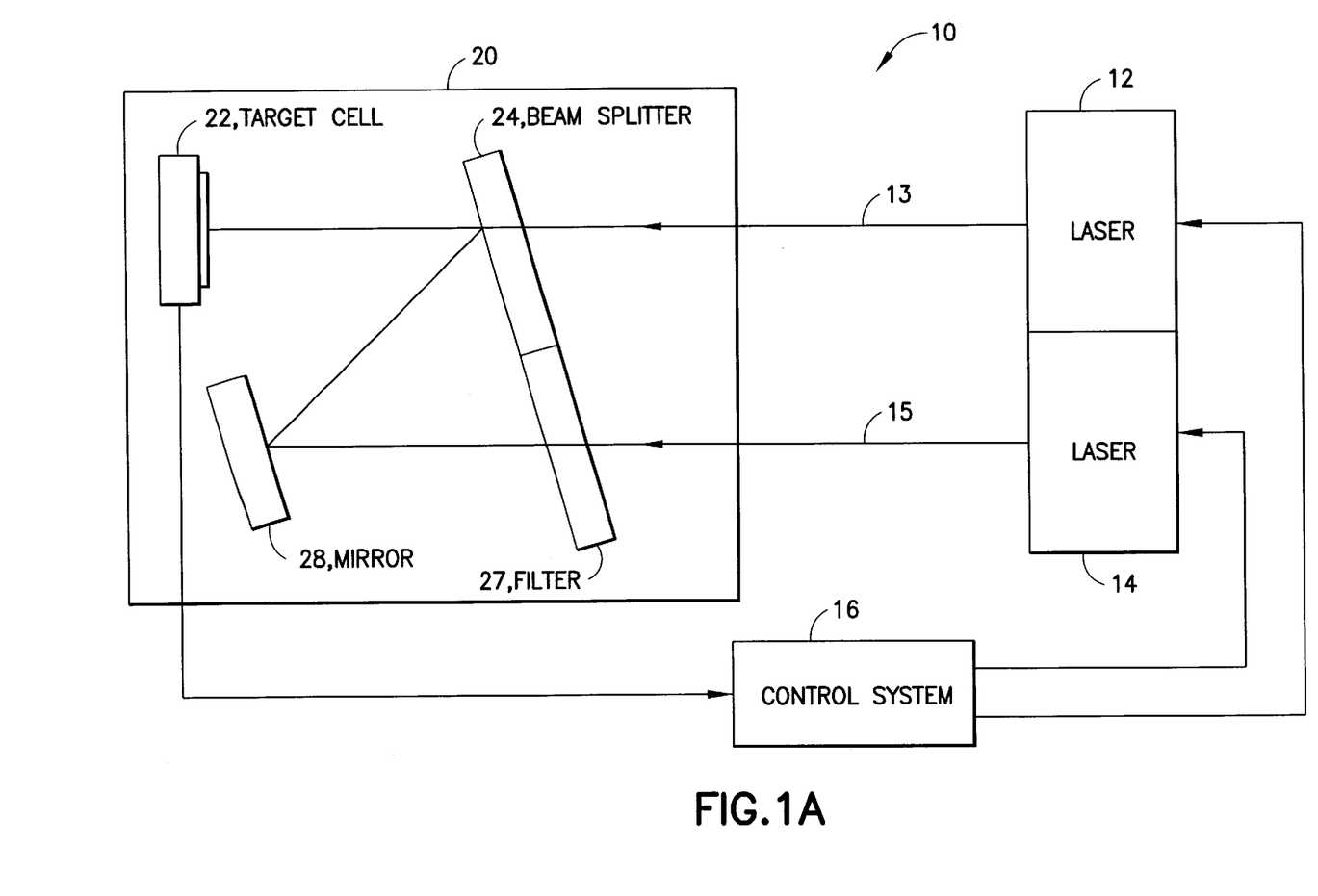
FIG. 1A is a schematic view of a first embodiment of a target assembly in accordance with the subject invention.

A laser alignment system in accordance with the subject invention is identified generally by the numeral 10 in FIG. 1A. The laser alignment system 10 includes first and second laser emitters 12 and 14 which are operative to produce first 13 and second 15 laser beams that are parallel to one another. The lasers may be any commercially available laser emitter, and preferably diode lasers of the type sold by Hamar Laser Instruments, Inc. and disclosed, for example, in the above referenced U.S. Pat. No. 5,307,368. The lasers 12 and 14 are connected to a control system identified generally by the numeral 16. The control system may be generally of the type disclosed in U.S. Pat. No. 4,679,940 to Martin R. Hamar. The control system 16 is operative to sequentially power the lasers 12 and 14 so that only one of the first and second lasers 12 and 14 is on at the same time. Additionally, the control system 16 preferably is operative to leave an elapsed time between the termination of power to the first laser 12 and the switching of power to the second laser 14. The elapsed time between the powering of the firs and second lasers 12 and 14 enables the system 10 to assess and compensate for background light.

The laser system 10 further includes a target assembly 20. The target assembly 20 includes a light sensitive target cell 22, a beam splitter 24, a filter 27 and a mirror 28. The light sensitive target cell 22 is disposed to align substantially with the first laser beam 13 produced by the first laser 12. The beam splitter 24 is disposed between the light sensitive target cell 22 and the first laser 12. Thus, the first laser beam 13 will pass through the beam splitter 24 and impinge upon the light sensitive target cell 22. Impingement of the first beam 13 on the light sensitive target cell 22 produces the electrical signals that are indicative of X and Y coordinates of the center of energy of the first laser beam 13 impinging upon the light sensitive target cell 22. The light sensitive target cell 22 is connected electrically to the control device 16, and signals produced by the light sensitive target cell 22 in response to impingement by the first beam 13 are used to provide X-axis and Y-axis positional data indicative of displacement of the target assembly 20 relative to the fixed reference line defined by the first beam 13.

The mirror 28 is spaced a selected distance from the filter 27, preferably made of red glass, and is disposed to be impinged upon by the second laser beam 15. The mirror 28 is aligned at an angle so that the second laser beam 15 is reflected from the mirror 28 onto the rear face of the beam splitter 24. The beam splitter 24 also is angularly aligned relative to the axes of the first and second laser beams and is substantially parallel to the mirror 28. As a result, the beam splitter functions to reflect at least a portion of the second beam 15 toward the light sensitive target cell 22. The target cell 22 will produce X-axis and Y-axis coordinate data to identify the location at which the second laser beam impinges 15 on the light sensitive target cell 22. In this instance, however, the positional information corresponding to the X and Y coordinates of the center of energy of the second laser beam 15 on the light sensitive target cell 22 provides angular alignment information that corresponds to pitch and yaw of the target cell plane relative to the axis defined by the second laser beam 15. The control system 16 uses signals produced sequentially and alternately by impingement of the first and second laser beams on the light sensitive target cell 22 to provide displacement errors and angular alignment errors or to provide correction information to bring the target cell 22 into a proper location and a proper alignment.

Figure 1B:
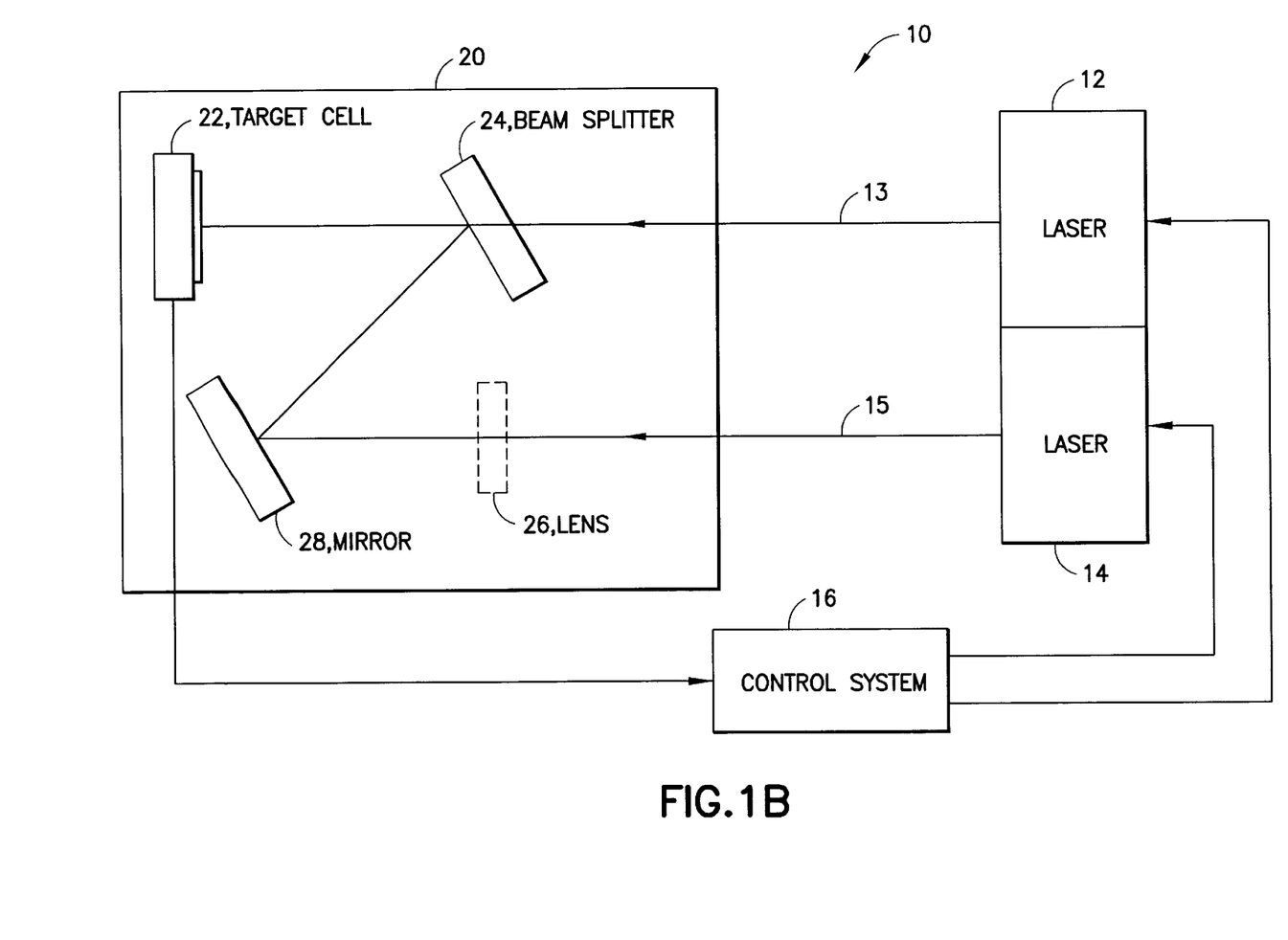
FIG. 1B is a schematic new of a modified version of the first embodiment of a target assembly in accordance with the subject invention.

FIG. 1B shows a modified version of the laser alignment system 10 employing a lens 26 in lieu of filter 27. The lens 26 is disposed to be impinged upon by the second beam 15 produced by the second laser 14. The lens 26 has a specified focal length and functions to focus the second laser beam 15 at a location spaced from the lens 26. The mirror 28 is spaced a selected distance from the lens 26 and is disposed to be impinged upon by the partly focused second laser beam 15. The combined optical distances from the lens 26 to the mirror 28, from the mirror 28 to the beam splitter 24 and from the beam splitter 24 to the light sensitive target 22 is substantially equal to the focal length of the lens 26. Thus, the second laser beam is focused substantially onto the target cell 22.

Figure 2A:
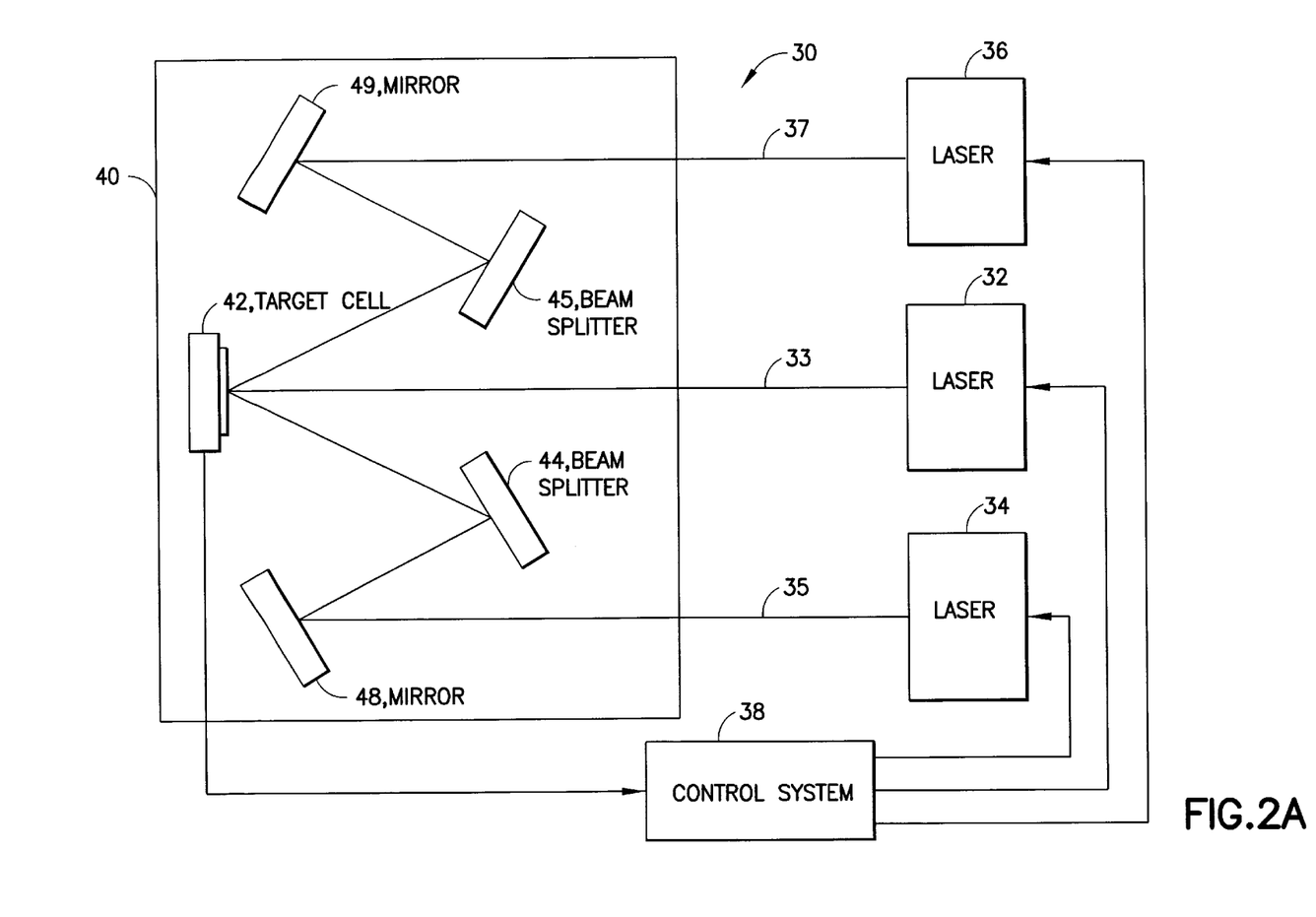
FIG. 2A is a schematic view of a second embodiment of a target assembly in accordance with the subject invention.

FIG. 2A shows a second laser alignment system 30 that is structurally and functionally similar to the laser alignment system 10 shown in FIGS. 1A and 1B. The laser alignment system 30 differs from the laser alignment system 10 in that it includes first, second and third lasers 32, 34 and 36 respectively for producing first, second and third laser beams 33, 35 and 37 respectively. A control system 38 is provided for sequentially powering the first, second and third laser beams 32, 34 and 36 substantially as described above.

A target assembly 40 is provided and includes a single light sensitive target cell 42. The target assembly 40 further includes first and second focusing lenses 46 and 47, first and second mirrors 48 and 49 and first and second beam splitters 44 and 45. The first beam 33 produced in the system 30 is aligned to impinge directly on the target cell 42 without focusing. Thus, the first beam 33 in the laser alignment system 30 functions substantially as the first beam 13 in the laser alignment system 10 to provide X-axis and Y-axis positional data. The second 35 and third 37 beams are focused by the lenses 46 and 47 respectively. Additionally, the mirrors 48 and 49 and the beam splitters 44 and 45 function to reflect the second 35 and third 37 beams onto the light sensitive target cell 42. Additionally, the relative dimensions and spacings of the components of the target assembly 40 are such that the second 35 and third 37 laser beams are substantially focused onto the light sensitive target cell 42. The second 35 and third 37 beams function as if the readings made by the light sensitive target cell 42 are made from targets that are located directly behind the mirrors and axially aligned with the second 35 and third 37 beams approaching the target assembly 40. Thus, the target assembly 40 functions as if there were three target cells disposed at the respective corners of a triangle, and preferably the corners of an equilateral triangle. Readings made by the target cell 42 from the second 35 and third 37 laser beams can be substracted from one another, and the difference provides an indication of pitch errors. The average of the readings made by the target cell 42 from the second 35 and third 37 beams define displacement errors relative to the plane defined by the second 35 and third 37 laser beams. Yaw alignment errors can be calculated based on the difference between readings taken by the target cell 42 based on the first laser beam 33 and the average of the readings taken by the second 35 and third 37 beams. Displacement errors are based upon actual readings based on the first beam 33. Thus, the laser alignment system 30 includes three relatively inexpensive lasers and a single fairly expensive light sensitive target cell to provide displacement data and alignment data relative to two axes at substantially lower costs than prior art systems that require a plurality of fairly expensive light sensitive target cells.

Figure 2B:
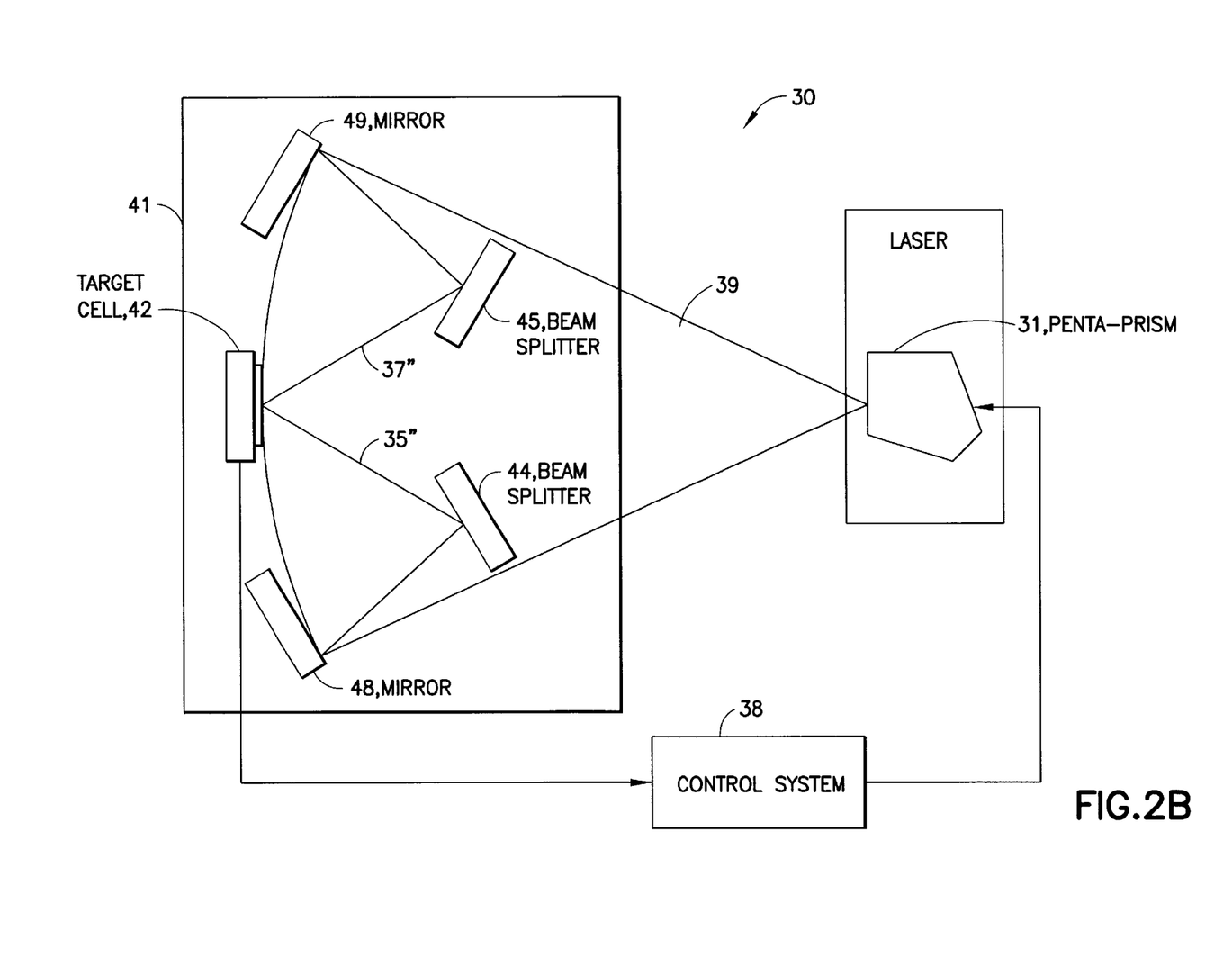
FIG. 2B is a schematic view of the second embodiment of a target assembly in accordance with the subject invention employing a single laser plane in lieu of plural lasers.

FIG. 2B shows a modified version of the second laser alignment system 30 where a laser with a penta-prism 31 is employed to generate a scan plane 39 instead of plural lasers producing individual laser beams. When utilizing a scan plan 39, the target assembly 41 will not require lens 46, 47 to focus the laser beams. As the scan plane sweeps pass the target 41, the first mirror 48 reflects beam 35', which serves the same purpose as laser beam 35 described above. Laser beam 37' is similarly reflected from second mirror 49. Penta-prism 31 and target assembly 41 provide the same functionality and follow the same operating principles as described above with respect plural laser 32, 34, 36 and target assembly 40.

Figures 3, 4:
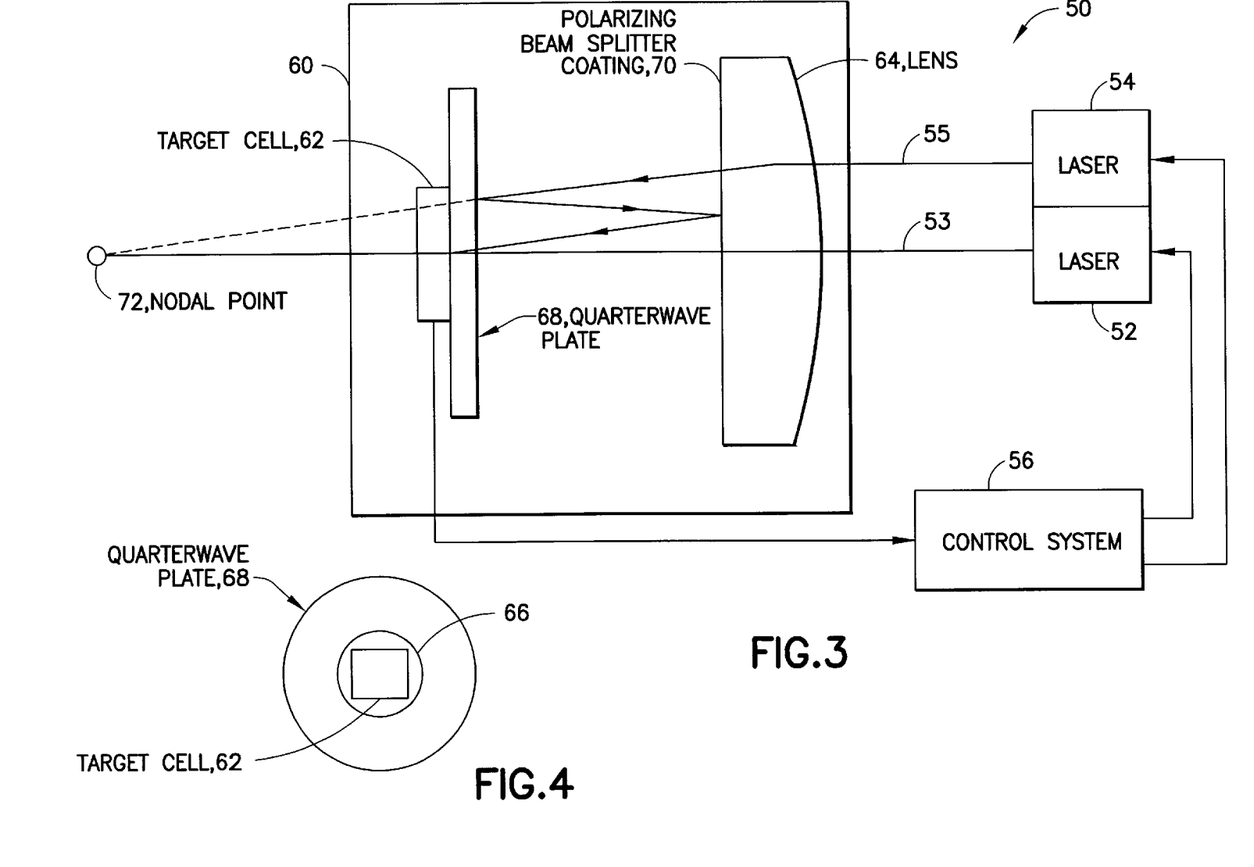
FIG. 3 is a schematic view of a third embodiment of a target assembly in accordance with the subject invention.
FIG. 4 is an elevational view of a ¼ wave plate of a target assembly in accordance with the subject invention.

A third laser alignment system is identified generally by the numeral 50 in FIG. 3. The third laser alignment system 50 is similar to the first embodiment in the first and second lasers 52 and 54 are provided for generating first 53 and second 55 parallel laser beams. The laser alignment system 50 also may include a control system 56 which is operative to sequentially power the lasers 52 and 54. Furthermore, a target assembly 60 is provided with a single light sensitive target cell 62. In other respects, however, the laser alignment system 50 differs significantly from the first and second embodiments. In particular, the target assembly 60 includes a lens 64, a polarizing beam splitter 70 and a mirror 66 with a quarter wave plate 68. The first laser beam 53 is aligned to pass centrally through the lens 64. The lens 64 starts to focus the beam on the cell 62. However, the distance between the lens 64 and the cell 62 is substantially less than the focal length, length "a", of the lens 64. The second beam 55 is parallel the first beam 53, but is offset from the axis of the lens 64. The second beam 55 is partly focused by the lens 64 and strikes the mirror 66 at an angle. The mirror 66 reflects the second beam 55 back to the lens 64. The rear face of the lens 64 has a polarizing beam splitter 70 coated thereon and further reflects the second beam 55 back to the target cell 62.

The combined optical length of the second beam 55 from the lens 64 to the mirror 66, form the mirror 66 back to the lens 64 and from the lens 64 to the target cell 62 substantially equal the focal length, "a", of the lens 64. The target cell 62 identifies the position at which the second beam 55 impinges thereon. This positional information for the focused second beam 55 is used to identify angular alignment errors substantially as with the single laser, single target system of U.S. Pat. No. 4,483,618 or U.S. Pat. No. 6,292,303. The disclosures of U.S. Pat. Nos. 4,483,618; 4,679,940; and 5,307,368, referred to above, are incorporated herein by reference.

If the target assembly 60 is moved laterally perpendicular to the first beam 53, then position information is read from the target cell 62 as described above. However, the partial focusing of the first beam that is caused by the lens 64 means that the target cell 62 also is partially sensitive to angle. In this regard, a typical prior art laser alignment system for measuring displacement is not sensitive to angle. However, in view of the fact that the target assembly 60 also measures angle based on the second beam 55, the center reading made with the first beam 53 can be corrected for any angle data determined with the second beam 55. This correction involves a simple algorithm to be performed by the control system 56 connected to both the lasers 52 and 54 and to the target cell 62.

A significant advantage of the target assembly 60 is that the combination of the first beam 53 and the lens 64 act to reduce the cross-sectional diameter of the first beam 53. This has the same effect as increasing the area of the target cell 62. Thus, the range of measurement is increased. The amount of the increase is proportional to the ratio of the focal length, "a", of the lens 64 divided by the distance, "b", of the nodal point 72 of the lens 64 to the surface of the target cell 62. In the illustrated example of FIG. 3, the target cell 62 has an effective size of 16×16 mm even though the actual size of the target cell 62 is only 10×10 mm. As noted above, light sensitive cells can be very expensive, and the cost increases dramatically for larger sizes. A 10 mm square cell is relatively inexpensive in view of the larger volume of production. Larger cells are not made in the same volume, and hence are significantly more expensive. Thus, the target assembly 60 described and illustrated above has the advantages of a much more costly target having a large target cell even though a much less expensive smaller target cell 62 is provided. Furthermore, a cost savings is achieved by having a single target cell 62 perform the function that might otherwise require two separate cells.

The lens 64 is a plano-concave lens with a polarizing sensitive 50%—50% beam splitter coating 70 on the plane or flat side of the lens 64. The polarizing sensitive coating will transmit almost 100% of P polarization and almost totally reflect S polarization. The plane of polarization of both the first and second beams are rotated so that approximately 100% of their light is transmitted.

In this embodiment, a quarter wave plate 68 is aluminum, Al, coated, on the back to form a mangrin mirror 66, as shown in FIG. 4. A quarter wave plate will take a plane polarized beam and turn it into a circularly polarized beam. Upon reflection, the beam will change "hand" from right circularly polarized to left hand. As the second beam passes again through the quarter wave plate, it is changed from circularly polarized light back to linear, but rotated 90°. The second beam then reflects nearly 100% off the back of the lens and so to focus on the cell.

Target assembly 60 described and illustrated above provides a more compact package than was previously available. Additionally, the combination of optical components increases the effective range of the target cell 62 for center readings at no increase in cell size or cost. Use of the smaller cell results in a much higher resolution system which in turn produces a more accurate measurement of center and angle.

Basically, in the practical and operation of the subject dual-beam laser alignment system, there is provided a single position sensing target and a dual-beam laser, as illustrated schematically in the sequence of FIGS. 5A–5D.

Figure 5A:
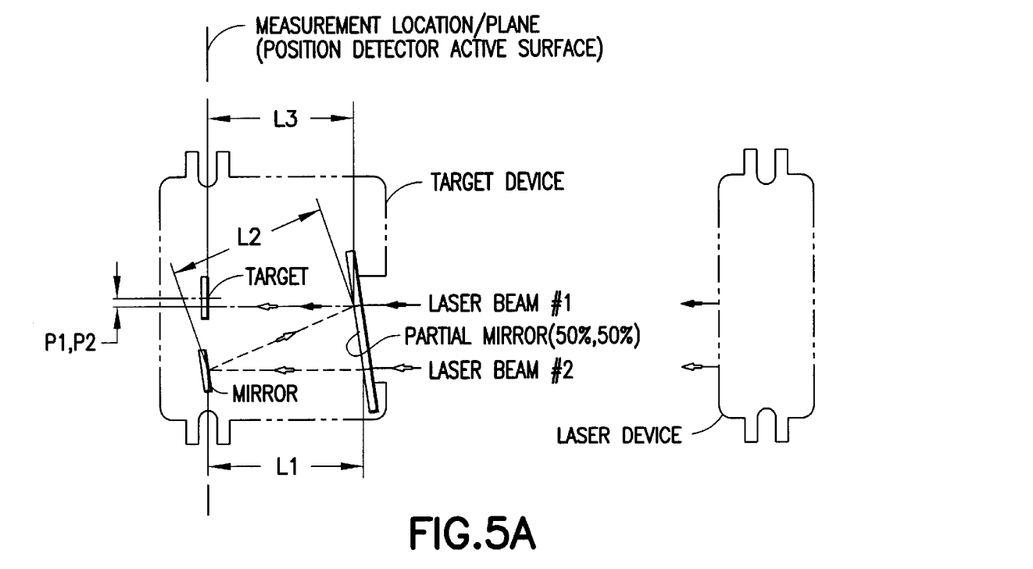
FIGS. 5A–5D are schematic illustrations for explaining the operation of the subject target assembly.

As shown in FIG. 5A, the Laser emits two alternating beams; only one beam is on the position detector at a time (when Beam#1 on the position detector, Beam #2 is off, and vice-versa). The target is able to distinguish between Beam #1 and #2 because the 'on-target' duration of Beam #1 is greater than the duration of Beam #2.

The target's optical system consists of a standard mirror, a 2-axis position detector, and a partial mirror that transmits 50% of the beam and reflects 50% of the beam. The two parallel Laser beams follow different optical paths inside the target. Beam #1 travels through a significantly shorter optical path than Beam #2. The difference between these path is equivalent to the focal length of a lens-based angle measuring target.

Figure 5B:
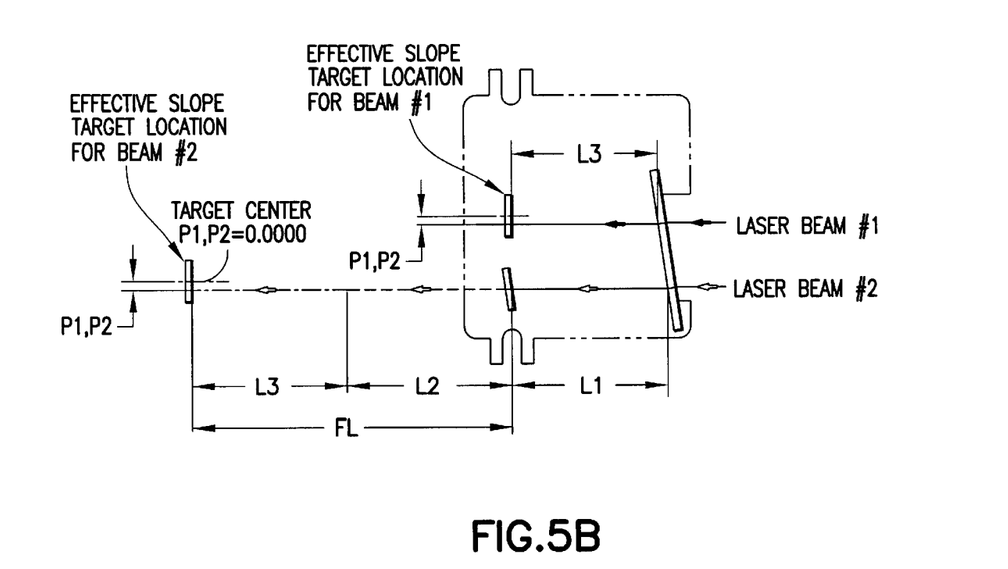
Figure 5C:
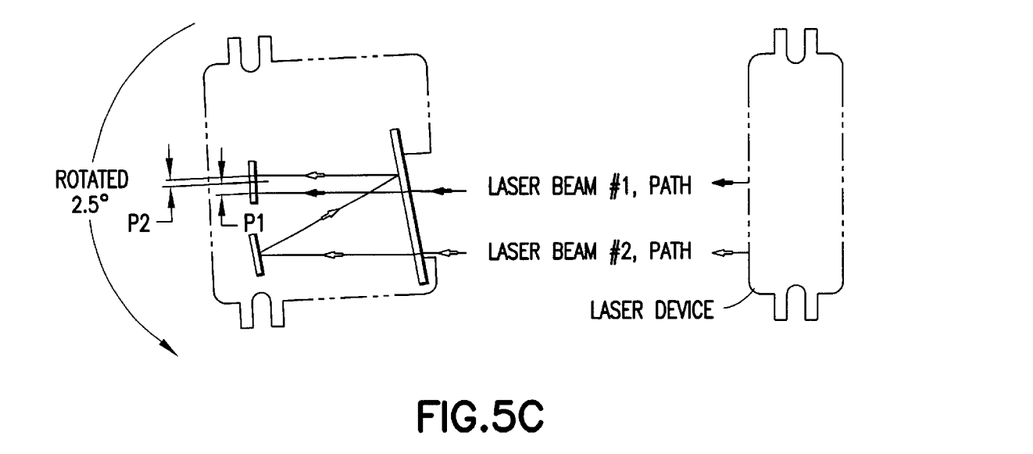

Referring to FIG. 5B, the target device has two active states:

a) Beam #1 ON, Beam #2 OFF: Beam #1 passes through the partial mirror, directly to the measurement location, through path L3. In this state the position detector reads P1 position; the center position reading. Beam #2 ON, Beam #1 OFF: Beam #2 passes through the partial mirror, reflects off the standard mirror, and reflects off the partial mirror onto the position detector, through path L1+L2+L3. Folding the Laser path in this manner creates a 'virtual target' behind the physical target. In this state the position detector reads P2 position; the combined Slope and Center position readings. FIG. 5B shows the unfolded optical path illustrated in FIG. 5A.

For Calculating the Center and Slope, the following is noted:

P1=Beam #1 position reading

P2=Beam #2 position reading

FL=Effective Position Detector displacement (virtual target), behind the physical Position Detector location.

Center=P1 reading (at the measurement plane, i.e. datum)

Slope=(P2 reading−P1 reading)/FL

FIG. 5A shows the target angularly aligned to the Laser but centrally displaced. Note that both Beams #1 and #2 coincide at path L3. The P1 and P2 position readings are equal, therefore the Slope=zero. That is always the case when the target is angularly aligned to the Laser at a normal angle of incidence, regardless of the central displacement.

Figure 5D:
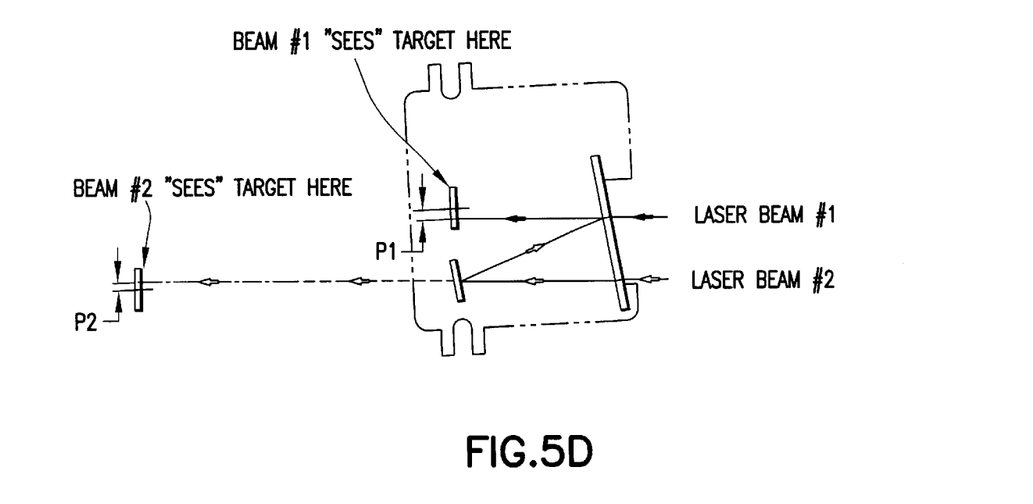

FIG. C shows the target rotated 2.5 degrees. As noted in FIG. 5C, Beam #1 and #2 are no longer coincident at path L3, as is the case when the target is not angularly aligned to the laser. P1 and P2 are not equal, therefore the Slope cannot be zero. For example: if P1=+0.048 inches, P2=−0.040 inches and FL=2.000 inches then the Slope=(−0.040−0.048)/2.000. Slope=0.044 inches/inch (−2.5 degrees). FIG. 5D shows the unfolded laser path for his example.

The above is the method by which the subject invention is employed for determining position and slope While the invention has been described with respect to a preferred embodiment, it is apparent that various changes can be made without departing from the scope of the invention as defined by the appended claims.

What is claimed is:

1. A laser alignment system comprising:
   at least first and second lasers disposed for generating at least first and second laser beams aligned substantially parallel to one another; and
   a target assembly comprising a light sensitive target cell operative for producing electrical signals indicative of locations at which one of said first and second laser beams impinges on said target cell, said target cell being disposed substantially in alignment with the first laser beam such that signals produced by the target cell in response to the first laser beam identify displacement data of the target cell relative to the first laser beam, the target assembly further including at least one mirror assembly having a first mirror disposed for reflecting the second laser beam and producing a first reflection of the second laser beam, the mirror assembly further comprising a first reflection means disposed for reflecting the first reflection of the second laser beam along a path substantially parallel to the first laser beam and onto the target cell, impingement of the second laser beam on the target cell providing data for identifying angular alignments of the target cell relative to the first and second laser beams.

2. A laser alignment system as in claim 1, wherein the first reflection means comprises a beam splitter, said beam splitter being disposed substantially in alignment between said first laser and said target cell, wherein said first laser beam passes through said beam splitter to impinge said target cell, said beam splitter is angularly aligned relative to axes of said first and second laser beams and is substantially parallel to said first mirror whereby said beam splitter reflects said second laser beam from said first mirror onto said target cell.

3. A laser alignment system as in claim 2, furthering comprising a filter, said filter being disposed substantially between said second laser and said mirror.

4. A laser alignment system as in claim 2, further comprising a focusing lens for focusing said second laser beam, said lens being disposed substantially between said second laser and said mirror.

5. A laser alignment system as in claim 4, wherein said focusing lens comprises a focal length.

6. A laser alignment system as in claim 5, wherein a combined optical distance from said lens to said mirror, from said mirror to said beam splitter and from said beam splitter to said target cell is substantially equal to said focal length of said lens.

7. A laser alignment system as in claim 1, further comprising a third laser disposed for generating a third laser beam substantially parallel to the first and second laser beams, the target assembly comprising a second mirror assembly having a second mirror disposed for reflecting the third laser beam and producing a first reflection of the third laser beam, the mirror assembly further comprising a second reflection means for reflecting the first reflection of the third laser beam along a path substantially parallel to the first laser beam and onto the target cell.

8. A laser alignment system as in claim 7, wherein the first and second reflection means are first and second beam splitters.

9. A laser alignment system as in claim 8, wherein said first beam splitter is angularly aligned relative to an axis of said second laser beam and is substantially parallel to said first mirror, whereby said first beam splitter reflects said second laser beam from said first mirror onto said target cell.

10. A laser alignment system as in claim 9, wherein said second beam splitter is angularly aligned relative to an axis of said third laser beam and is substantially parallel to said second mirror, whereby said second beam splitter reflects said third laser beam from said second mirror onto said target cell.

11. The laser alignment system of claim 1, further comprising a lens disposed such that the first and second laser beams pass through the lens, the first laser beam passing centrally through the lens such that the lens partly focuses the first laser beam, the lens reducing cross-sectional dimensions of the first laser beam impinging on the light sensitive target cell, thereby effectively increasing dimensions of the light sensitive target cell relative to the first laser beam.

12. The laser alignment system as in claim 11, wherein the lens is a planolens having a planar surface facing the light sensitive target cell, the planar face of the lens being coated with a polarizing beam splitter, said beam splitter reflects said second laser beam from said mirror onto said target cell.

13. The laser alignment system of claim 12, wherein said lens comprises a focal length.

14. The laser alignment system of claim 13, wherein a combined optical distance from said lens to said mirror, from said mirror to said beam splitter and from said beam splitter to said target cell is substantially equal to said focal length.

15. The laser alignment system of claim 14, wherein said mirror is ¼ wave plate including a first and second surface, said second surface being coated with an annular aluminum, Al, coating leaving a center portion clear.

16. The laser alignment system of claim 15, wherein said mirror is positioned between said lens and said target cell, said target cell positioned to be in contact with said clear portion of said mirror.

17. The laser alignment system of claim 16, wherein an effective cell size of said target cell is increased by the ratio of said focal length of said lens divided by a distance of a nodal point of the lens to a surface of the target cell.

18. A laser alignment system comprising;
    at least a first laser and a penta-prism for generating a flat optical light plane; and
    a target assembly comprising a light sensitive target cell operative for producing electrical signals indicative of locations at which said light plane impinges on said target cell, the target assembly further including first and second mirror assemblies disposed for reflecting the light plane onto the target cell such that the target cell sequentially reads first impingement data when said light plane is reflected from said first mirror assembly, second impingement data when said light plane is aligned directly with said target cell and third impingement data when said light plane is reflected from said second mirror assembly, whereby said first and third impingement data identify angular alignments of the target cell relative to the light plane and the first impingement data of the target cell identifies relative to the light plane.

19. A laser alignment system as in claim 18, wherein said first and second mirror assemblies comprise first and second mirrors respectively and first and second beam splitters corresponding respectively to each said first and second mirrors.

20. A laser alignment system as in claim 19, wherein said first beam splitter is substantially parallel to said first mirror, whereby said first beam splitter reflects said light plane from said first mirror onto said target cell.

21. A laser alignment system as in claim 20, wherein said second beam splitter is substantially parallel to said second mirror, whereby said second beam splitter reflects said light plane beam from said second mirror onto said target cell.

22. A target assembly for a laser alignment system, said target assembly comprising a light sensitive target cell disposed such that a first laser beam directed along a first axis impinges on said target cell, a beam splitter disposed along the first axis and oriented such that the first laser beam directed along the first axis passes through the beam splitter and impinges on the target cell, the beam splitter being angularly aligned to the target cell such that a second laser beam directed along a second axis reflects off the beam splitter and impinges on the target cell, and a mirror substantially parallel to the beam splitter and disposed for reflecting the second laser beam along the second axis and onto the beam splitter, such that the second laser beam reflected by the mirror and the beam splitter impinges on the target cell.

23. A method for collecting laser alignment and displacement data, said method comprising;
  emitting a first laser beam;
  directing the first laser beam through a beam splitter and onto a target cell;
  interrupting the first laser beam;
  emitting a second laser beam substantially parallel to the first laser beam; and
  reflecting the second laser beam through a first angle and onto the beam splitter and then reflecting the second laser beam from the beam splitter through a second angle and onto the target cell, the first end second angles being substantially equal.

* * * * *